Sept. 29, 1942.   D. S. WEISS   2,297,182

TRAILER COUPLING

Filed May 20, 1940

*Inventor:*
Dewey S. Weiss,
By Rudolph B. Prentice,
*Attorney.*

Patented Sept. 29, 1942

2,297,182

UNITED STATES PATENT OFFICE 2,297,182

TRAILER COUPLING

Dewey S. Weiss, Portland, Oreg.

Application May 20, 1940, Serial No. 336,196

2 Claims. (Cl. 280—33.17)

This invention relates to trailer couplings of the general type employing ball-and-socket means.

The principal object of this invention is the provision of a ball-and-socket coupling with permanently engaged ball and socket elements.

A second object of this invention is the provision for protected and easily lubricated wearing surfaces.

A third object of this invention is the provision of means to compensate wear in the various parts.

Other objects and advantages of this invention will be apparent in the following discourse wherein the significance of the reference numerals in the accompanying drawing, details of construction and operation of a typical coupling embodying this invention, and the particular advantages thereof are explained.

Figure 1:
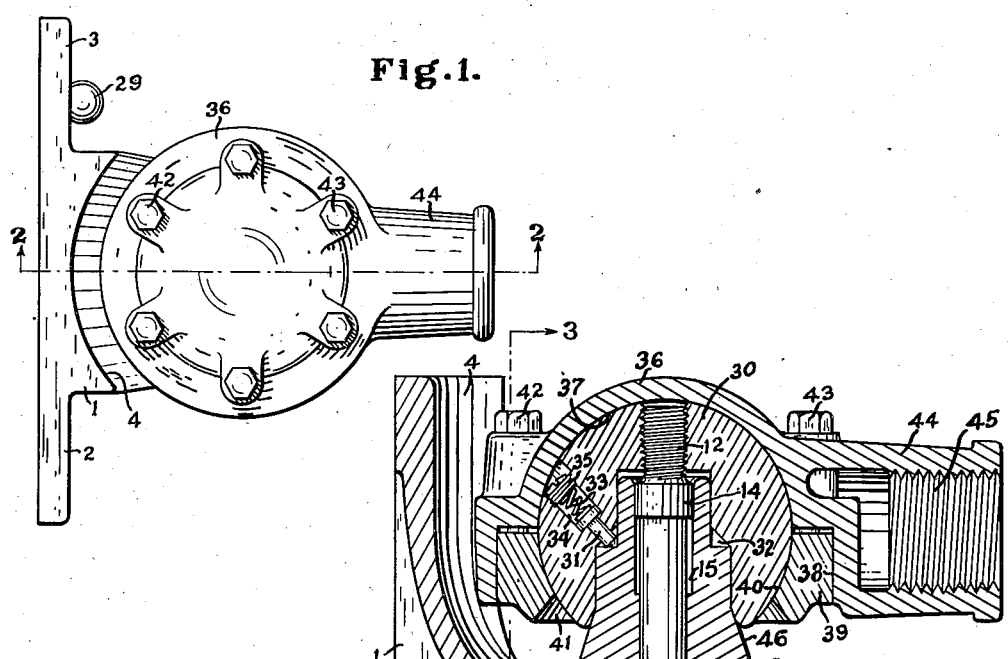
Figure 1 represents a view of the top of the coupling.
Figure 3:
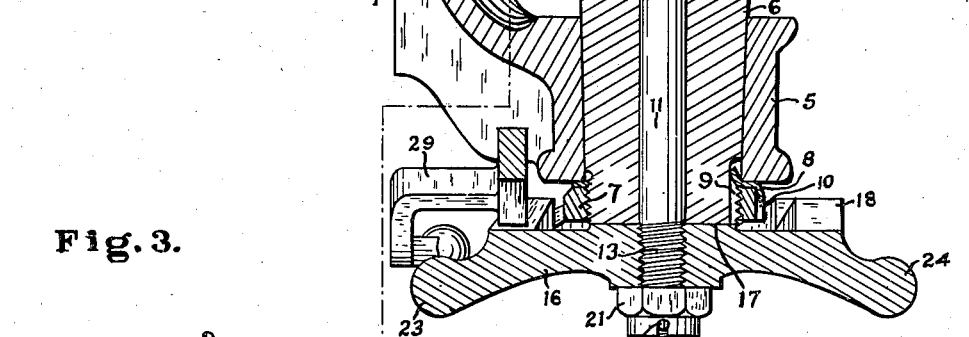
Figure 3 represents a view of a fragmentary section of the coupling taken on the line 3—3 of Figure 2.

A main body-member 1 having laterally extending attaching plates 2 and 3 is formed with a rearwardly exposed cupped surface 4 and depending conical socket 5 into which latter a taper-pin 6 is secured by means of the nut 7 threaded thereon and locked in position by the lock-washer 8 engaging suitable flutes 9 and 10 in the pin and nut respectively.

A bolt 11 is slidable through the center of the pin 6 and is formed with upper and lower screw-threads 12 and 13 respectively, and an annular shoulder 14 slidable through the chamber 15 in the upper end of the pin 6.

To the lower end of this bolt 11 a hand-wheel 16, formed upon its upper side with ratchet teeth as 18, 19, and 20, and a bearing surface 17, is rigidly secured by means of the nut 21 and pin 22. Convenient handles 23 and 24 provide a means of manipulating the bolt 11 in rotation.

A pawl 25 is pivotally mounted at 26 upon the body 1 and is formed with a stop 27 adapted to engage the feature 28 of the body 1, and a handle 29 by means of which the pawl 25 may be raised out of engagement by hand.

Figure 2:
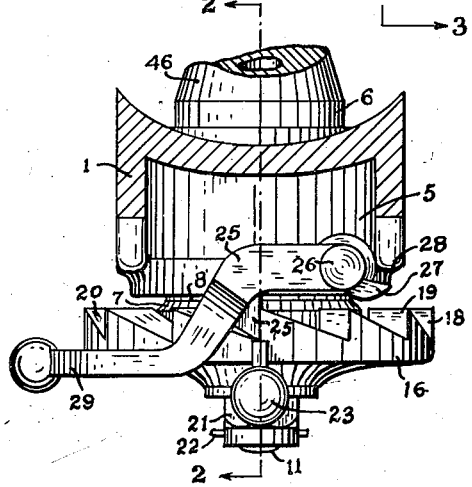
Figure 2 represents a view of a section of the coupling taken on the lines 2—2 of Figures 1 and 3.

Upon the upper end of the pin 6 a ball 30, formed interiorly with recess features to detachably fit thereover as shown in Figure 2, is immovably secured by means of the bolt 11 screwed into the ball as shown in this figure by operation of the hand-wheel 16.

A pin 31 engaging a suitable notch as 32 in the pin 6 as impelled by a spring 33 within the chamber 34 and retained by the screw-plug 35, serves to prevent rotation of the ball 30 when the bolt 11 is turned into place.

The ball-socket consists of two members. The upper member 36 is formed interiorly with a hemispherical surface 37 and an enlarged cylindrical recess indicated at 38 to slidably receive the lower member 39 of annular form with an interior spherical surface 40, peripheral cylindrical surface as at 38, and lower conical recess 41 to allow of the proper movement of the socket over the ball. Screws as 42 and 43 serve to adjust the socket upon the ball.

The upper socket-member 36 is further formed with an integral tubular extension 44 with an internal thread 45 adapted to receive the tongue of a trailer.

As shown in Figure 2 the coupling is completed. To uncouple, the handle 29 is raised and the hand-wheel 16 is rotated to disengage the upper threads of the bolt 11 from the ball 30 when the bolt will descend until the upper end is entirely contained within the pin 6 in the chamber 15 thereof. Before the bolt 11 is entirely disengaged from the ball 30, the handle 29 may be released to fall to the position whereat the stop 27 contacts the feature 28 of the body 1 to hold the pawl 25 out of engagement with the lowered ratchet teeth as 18, 19, and 20 of the hand wheel 16. The annular shoulder 14 prevents the bolt 11 from falling out.

The assembly consisting of the ball and socket with trailer tongue attached, not shown, may be raised and the two parts of the coupling separated.

The adjustment of the socket upon the ball properly involves such compressive stresses as are commensurate with the normal load stresses of the device and since this degree of pressure between the ball and socket precludes any probability of displacement of the ball within its socket, the ball will remain in the same alignment as when it was removed from the pin 6.

To effect the coupling, the ball is re-engaged upon the pin 6 and the hand-wheel 16 raised and turned to engage the bolt 11 with the ball. It will be observed that the bolt 11 imposes a vertical force upon the ball to drive the latter securely down upon the conical surface 46 of the pin 6 to preclude any movement between the pin 6 and the ball 30 when the coupling is in operative use. The degree of this engagement may be adjusted by means of the hand-wheel 16 and the adjustment will be retained by the action of the pawl 25 in engagement with the ratchet teeth as 18.

It will be recognized that the ball and socket may be finely fitted and perfectly lubricated with hard-grease packing or other suitable lubrication and that by thus separating the detachable parts from the normally working parts two distinct means are provided to perform two distinct functions without conflict of desirable conditions for both. The parts exposed to dust and dirt in the uncoupled condition are not called upon to perform the functions of working parts in operation.

By thus providing means to impose upon the coupling stresses of the order of those imposed in operation, all motion between the engaged parts is effectually prevented.

Having described my invention, what I claim is:

1. A coupling comprising, a bracket formed and adapted for attachment to a tractor vehicle to provide a rearwardly extended tapered socket, a tubular ball-pin removably secured in said socket and extending upwardly therefrom, a screw axially slidable and rotatably disposed within said tubular ball-pin adapted for extension thereabove, a ball formed with a recess for engagement upon said ball-pin and threaded to receive said screw, a spring urged bolt disposed within said ball to extend into the recess in said ball to engage said ball-pin to prevent rotation of the ball upon the ball-pin, and ball-socket means permanently engaged upon said ball formed and adapted for attachment to a trailer tongue.

2. A coupling as described in claim 1 wherein the said bracket is fitted with gravity actuated means to lock the said screw against accidental rotation.

DEWEY S. WEISS.